(12) United States Patent
Maschino et al.

(10) Patent No.: US 12,358,027 B2
(45) Date of Patent: Jul. 15, 2025

(54) SCRUBBING WIPE AND METHOD FOR MAKING SAME

(71) Applicant: FITESA FILM PRODUCTS LLC, Simpsonville, SC (US)

(72) Inventors: Andrew D. Maschino, Paris, IL (US); Randolph Scott McCoskey, Farmersburg, IN (US)

(73) Assignee: FITESA FILM PRODUCTS LLC, Simpsonville, SC (US)

( * ) Notice: Subject to any disclaimer, the term of this patent is extended or adjusted under 35 U.S.C. 154(b) by 373 days.

(21) Appl. No.: 16/211,403

(22) Filed: Dec. 6, 2018

(65) Prior Publication Data

US 2019/0168266 A1 Jun. 6, 2019

Related U.S. Application Data

(60) Provisional application No. 62/595,132, filed on Dec. 6, 2017.

(51) Int. Cl.
| | |
|---|---|
| *B32B 27/32* | (2006.01) |
| *B08B 1/14* | (2024.01) |
| *B32B 3/26* | (2006.01) |
| *B32B 5/02* | (2006.01) |
| *B32B 27/12* | (2006.01) |
| *B32B 37/10* | (2006.01) |
| *B32B 37/15* | (2006.01) |

(52) U.S. Cl.
CPC ............. *B08B 1/143* (2024.01); *B32B 3/266* (2013.01); *B32B 5/028* (2013.01); *B32B 27/12* (2013.01); *B32B 27/32* (2013.01); *B32B 37/1018* (2013.01); *B32B 37/153* (2013.01); *B32B 2305/02* (2013.01); *B32B 2305/38* (2013.01); *B32B 2432/00* (2013.01)

(58) Field of Classification Search
CPC ......... B08B 1/006; B32B 27/32; B32B 5/028; B32B 3/266; B32B 37/1018; B32B 37/153; B32B 27/12; B32B 2305/38; B32B 2432/00; B32B 2305/02; B32B 2262/0253; B32B 2262/12; B32B 5/08; B32B 27/20; B32B 2250/02; B32B 2307/718
USPC ........................ 442/1–59; 428/131–137, 139
See application file for complete search history.

(56) References Cited

U.S. PATENT DOCUMENTS

| | | | | |
|---|---|---|---|---|
| 3,331,728 | A * | 7/1967 | Lane | ................. A61F 13/00021 |
| | | | | 428/137 |
| 4,159,883 | A | 7/1979 | Mizell | |
| 8,881,336 | B2 * | 11/2014 | Pung | ......................... B08B 1/00 |
| | | | | 15/228 |
| 2004/0161586 | A1 * | 8/2004 | Cree | ....................... B29C 59/04 |
| | | | | 428/137 |

(Continued)

OTHER PUBLICATIONS

USPC definition of scrim.*

(Continued)

*Primary Examiner* — Elizabeth M Imani
(74) *Attorney, Agent, or Firm* — KARCESKI IP LAW, PLLC

(57) ABSTRACT

A scrubbing wipe includes a scrim that includes a plurality of filaments, and a formed film attached to the scrim. The formed film encompasses at least 50% of the circumferences of at least a portion of the plurality of filaments and includes a plurality of apertured extended cells extending away from the scrim.

35 Claims, 5 Drawing Sheets

(56) References Cited

U.S. PATENT DOCUMENTS

| | | |
|---|---|---|
| 2005/0076936 A1 | 4/2005 | Pung et al. |
| 2005/0164901 A1 | 7/2005 | Foley et al. |
| 2006/0105143 A1* | 5/2006 | Darnella Dorsey .... B32B 27/12 |
| | | 428/137 |
| 2012/0279005 A1 | 11/2012 | Pung et al. |
| 2014/0109333 A1 | 4/2014 | Gummow |
| 2016/0174777 A1* | 6/2016 | Wang ..................... A47K 10/16 |
| | | 442/57 |

OTHER PUBLICATIONS

International Preliminary Report on Patentability dated Jun. 9, 2020, for International Patent Application No. PCT/US2018/064168.

Chinese Office Action dated May 19, 2021, for Chinese Patent Application No. 201880078738.6.

Chinese Office Action dated Dec. 21, 2021, for Chinese Patent Application No. 201880078738.6.

International Search Report and Written Opinion dated Feb. 4, 2019, for International Patent Application No. PCT/US2018/064168.

* cited by examiner

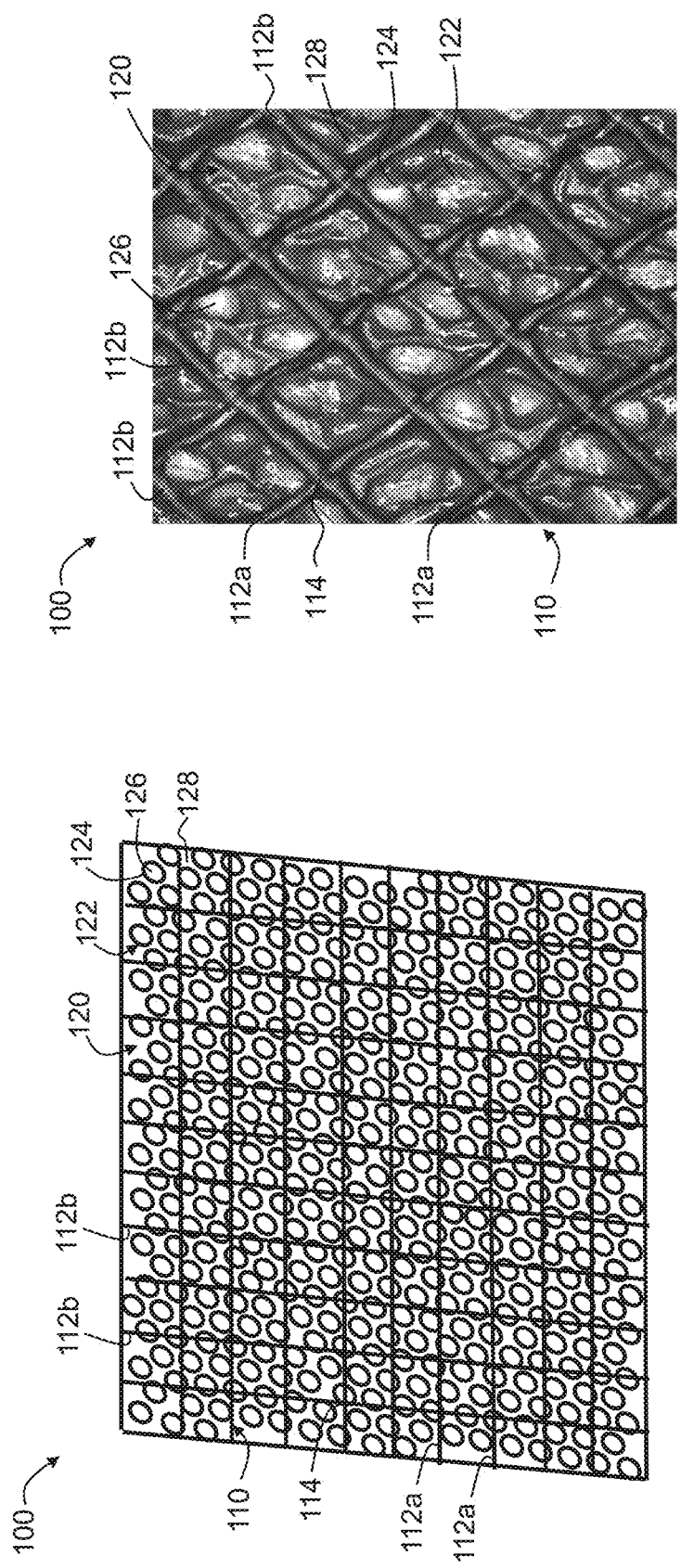

SCRUBBING WIPE AND METHOD FOR MAKING SAME

CROSS-REFERENCE TO RELATED APPLICATIONS

This application claims the benefit of U.S. Provisional Patent Application Ser. No. 62/595,132, filed Dec. 6, 2017, the entire content of which is incorporated herein by reference.

FIELD

The present invention is directed to a scrubbing wipe that may be used in cleaning applications, and a method for making the scrubbing wipe.

BACKGROUND

Paper towels and other fiber-based wipes have been traditionally used as scrubbing substrates to clean a variety of surfaces. Such products are typically used in a single application and are then disposed of.

For a number of reasons, it is desirable to have a flexible material that can be used as a wipe for scrubbing surfaces, particular in cleaning applications, that is robust and can be reused multiple times in multiple applications.

SUMMARY

According to an aspect of the invention, there is provided a scrubbing wipe that includes a scrim that includes a plurality of filaments, and a formed film attached to the scrim. The formed film encompasses at least 50% of the circumferences of a portion of the plurality of filaments and includes a plurality of apertured extended cells extending away from the scrim.

According to an aspect of the invention, there is provided a method for manufacturing a scrubbing wipe. The method includes feeding a scrim that includes a plurality of filaments onto a forming structure that includes a plurality of apertures, extruding a polymer web onto the scrim as the scrim passes over the forming structure, and applying a vacuum through the forming structure to pull portions of the polymer web through openings in the scrim and into the apertures of the forming structure to form the scrubbing wipe that includes the scrim and a formed film attached to the scrim. The formed film encompasses at least 50% of the circumferences of a portion of the plurality of filaments and includes a plurality of apertured extended cells extending away from the scrim.

In an embodiment, the formed film encompasses at least 50% of the circumferences of substantially all of the plurality of filaments.

In an embodiment, outside surfaces of sidewalls of the apertured extended cells form scrubbing pockets with the filaments of the scrim. In an embodiment, at least some of the sidewalls of the apertured extended cells extend in a direction normal to a plane containing the scrim, and at least some of the sidewalls of the apertured extended cells extend at an angle relative to normal to the plane containing the scrim.

In an embodiment, the scrim has a basis weight in the range of 60-65 grams per square meter.

In an embodiment, the plurality of filaments of the scrim comprise polypropylene.

In an embodiment, each of the plurality of filaments has a diameter in the range of 430-560 micrometers.

In an embodiment, adjacent filaments are substantially parallel to each other and spaced apart by a distance in the range of 2.8-3.3 millimeters.

In an embodiment, the formed film has a basis weight in the range of 35-40 grams per square meter.

In an embodiment, the formed film comprises polyethylene. In an embodiment, the formed film comprises a blend of low density polyethylene and high density polyethylene. In an embodiment, the formed film further comprises a surfactant.

In an embodiment, the plurality of apertured extended cells are arranged in a pattern of 4-6 apertured extended cells per linear centimeter.

These and other aspects, features, and characteristics of the present invention, as well as the methods of manufacturing and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

FIG. 1A schematically illustrates a top view of a scrubbing wipe in accordance with embodiments of the invention;

FIG. 1B is a picture that illustrates a bottom view of the scrubbing wipe of FIG. 1A;

DETAILED DESCRIPTION

FIGS. 1A and 1B illustrate a scrubbing wipe 100 according to embodiments of the invention. As illustrated, the scrubbing wipe 100 includes a scrim 110 and a formed film 120 attached to the scrim 110.

Figure 2B:
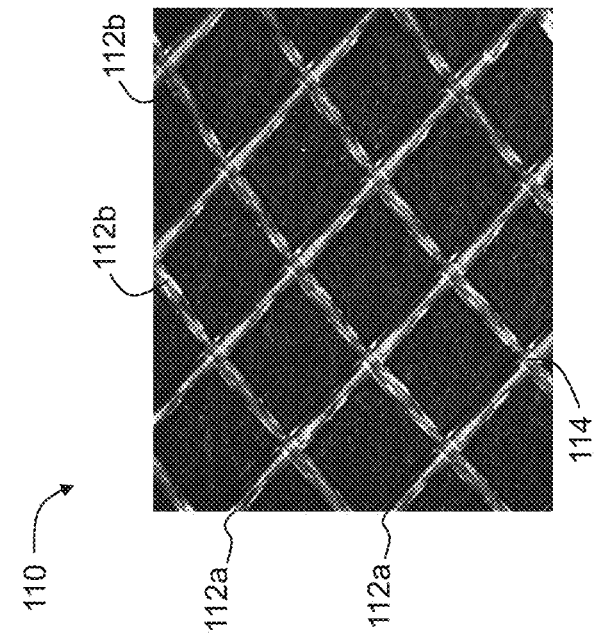
FIG. 2B is a picture that illustrates the scrim that is part of the scrubbing wipe of FIG. 1B.
Figure 2A:
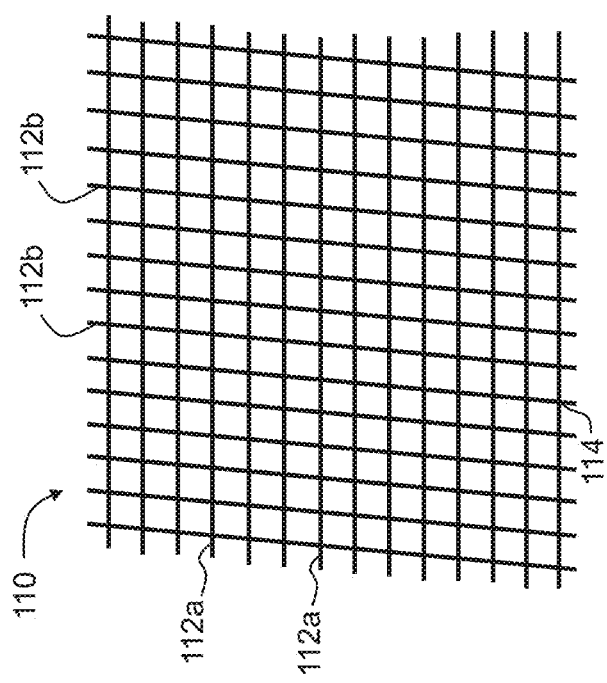
FIG. 2A schematically illustrates a scrim that is part of the scrubbing wipe of FIG. 1A.

The scrim 110 is shown in further detail in FIGS. 2A and 2B. As illustrated, the scrim 110 includes a plurality of filaments 112a, 112b that are arranged in a mesh-like or net-like pattern, with the filaments 112a being substantially parallel to and spaced from each other, and the filaments 112b being substantially parallel to and spaced from each other, as well as oriented at an angle to the filaments 112a. The two sets of filaments 112a and 112b cross and are connected at intersections 114 by known methods. Each of the filaments 112a, 112b may be made from the same material, such as polypropylene, for example. In an embodiment, the filaments 112a and 112b may be made from different materials, such as polypropylene and polyethylene, respectively, for example. In an embodiment, one or more filament 112a, 112b made be made from more than one material, such as having a core made from one material and a sheath made from another material. Each of the filaments 112a, 112b may have a diameter in the range of 250-760 micrometers (10-30 mils), or in the range of 380-635 micrometers (15-25 mils), or in the range of 430-560 micrometers (17-22 mils). In embodiments in which the diameters of the filaments are smaller, the scrim may be considered to be netting. In an embodiment, the filaments 112a may have a different average diameter than the filaments 112b. The spacing between adjacent filaments 112a and 112b may be in the range of 2.0-4.0 millimeters (78-158 mils), or in the range of 2.5-3.5 millimeters (98-138 mils), or in the range of 2.8-3.3 millimeters (115-125 mils), and the filaments 112a and 112b that intersect may be oriented substantially orthogonally to each other ±15°. In an embodiment, the spacing between the filaments 112a may be different than the spacing between the filaments 112b. In an embodiment, the scrim 110 may have a basis weight in the range of 40-100 grams per square meter (gsm), or in the range of 50-70 grams per square meter (gsm), or in the range of 55-65 grams per square meter (gsm), or in the range of 60-65 grams per square meter (gsm). In an embodiment, more than one scrim may be used in the scrubbing wipe.

As noted above, the illustrated embodiment is intended to depict a condition where the intersecting filaments 112a and 112b are oriented substantially orthogonally to each other ±15°. This condition, however, should not be understood to limit the scope of the present invention. Other angular relationships between the intersecting filaments 112a and 112b are understood to be suitable alternatives, as should be apparent to those skilled in the art.

Returning to FIGS. 1A and 1B, the formed film 120 is attached to the filaments 112a, 112b of the scrim 110, as described in further detail below. The formed film 120 includes a plurality of apertured extended cells 122 that extend away from the scrim 110. Each of the apertured extended cells 122 includes a continuous sidewall 124 surrounding an aperture 126 that extends through the formed film 120. Each sidewall 124 starts at a land 128 of the formed film 120 and has a thickness that decreases as the sidewall 124 extends away from the land 128, and scrim 110, to a distal end.

It is contemplated that not all of the extended cells may be apertured extended cells 122 but that some of the extended cells will not have an aperture 126 that extends therethrough. The extended cells without apertures 126 will have solid distal ends and, therefore, will not permit fluid to flow therethrough. While not intending to limit the present invention, it is contemplated that the formed film may include a greater number of apertured extended cells 122 than extended cells without apertures 126. To this end, a ratio of apertured extended cells 122 to extended cells without apertures 126 is contemplated to be 50% or more. Other contemplated ratios include 60%, 70%, 80%, 90%, 95%, and 100%. While a predominance of apertured extended cells 122 are contemplated for many embodiments of the present invention, it is also contemplated that some other embodiments may incorporate a predominance of extended cells without apertures 126. As noted, the precise ratio is not intended to limit the scope of the present invention.

In addition, although FIG. 1A schematically illustrates that the apertured extended cells 122 have the same size, embodiments of the invention include the apertured extended cells 122 having different sizes, as shown in FIG. 1B and described in further detail below. In an embodiment, the formed film 120 may have a basis weight in the range of 20-80 grams per square meter (gsm), or in the range of 25-50 grams per square meter (gsm), or in the range of 30-45 grams per square meter (gsm), or in the range of 35-40 grams per square meter (gsm). Additional details of the formed film and scrubbing wipe in accordance with embodiments of the invention are described below.

Figure 3:
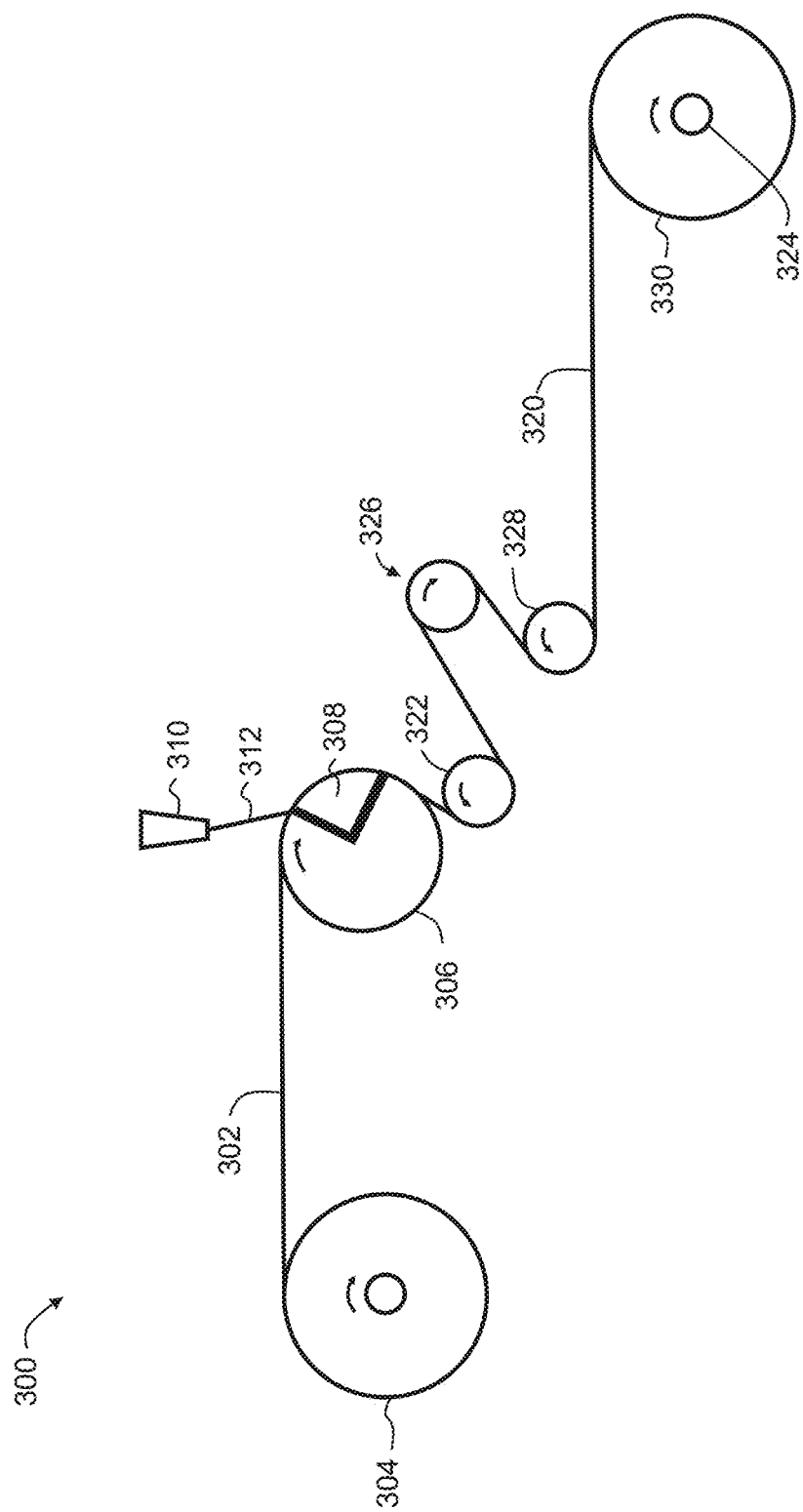
FIG. 3 schematically illustrates an embodiment of an apparatus used to manufacture the scrubbing wipe of FIGS. 1A and 1B.

FIG. 3 illustrates an apparatus 300 that may be used to manufacture scrubbing wipes in accordance with embodiments of the invention, including the scrubbing wipe 100 described above. As illustrated, a scrim 302, such as the scrim 110 described above, may be unwound from a scrim roll 304 and fed to a forming structure 306, such as a rotating forming screen. An extrusion die 310 is located at the end of at least one extruder (not shown) and is configured to form a polymer web 312. The polymer web 312 may be a single layer or a multi-layer polymer web. The material used to form the polymer web 312 may comprise polyethylene (PE) and/or polypropylene (PP). In an embodiment, the material used to form the polymer web 312 may be a blend of one or more polymers selected from the group consisting of low density polyethylene (LDPE), linear low density polyethylene (LLDPE), high density polyethylene (HDPE), and polypropylene (PP). In an embodiment, the polymer web 312 may be a blend of, for example, low density polyethylene (LDPE) and high density polyethylene (HDPE). In an embodiment, the polymer web 312 may also include a surfactant and/or other additives, such as colorants, as desired.

Figure 4:
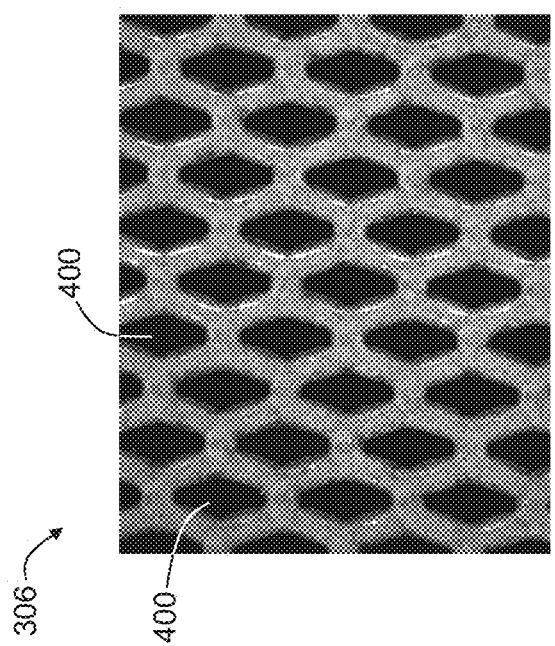
FIG. 4 is a picture of a forming structure that is part of the apparatus of FIG. 3.

In the embodiment illustrated in FIG. 3, the polymer web 312 exits the extrusion die 310 and is deposited onto the scrim 302 as the scrim 302 is passing over the forming structure 306 as the forming structure 306 rotates around a fixed vacuum slot 308 in which a vacuum is pulled. The forming structure 306 includes a plurality of apertures 400 arranged in one or more patterns, as illustrated in FIG. 4. In an embodiment, the plurality of apertures 400 are sized and arranged so that there are 10-15 apertures per linear inch (4-6 apertures per linear centimeter), or a 10-15 "mesh pattern" as is understood by persons of ordinary skill in the art. The apertures 400 may have different shapes and sizes than the shape and size illustrated in FIG. 4. The illustrated embodiment is not intended to be limiting in any way.

Figure 5:
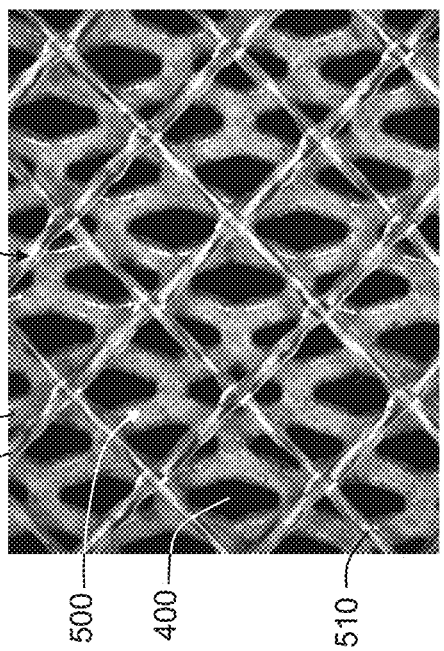
FIG. 5 is a picture of the scrim of FIG. 2B on top of the forming structure of FIG. 4.

FIG. 5 illustrates the scrim 302 on top of the forming structure 306 before the polymer web 312 is extruded on top of the scrim 302 and the forming structure 306. As illustrated, the apertures 400 in the forming structure 306 are smaller and of a different shape than openings 500 defined by filaments 510 of the scrim 302. An effect of the differences between the sizes of apertures 400 and openings 500 is described in further detail below.

When the polymer web 312 on the scrim 302 and the forming structure 306 passes over the vacuum slot 308, the portions of the polymer web 312 that are directly over the apertures 400 in the forming structure 306 are pulled into the apertures 400 to form extended cells (with or without apertures) that extend away from the scrim 302. The remaining portions of the polymer web 312 coat the exposed surfaces of the scrim 302 that are not in contact with the forming structure 306 and also contact the forming structure 306 in between the apertures 400. Because some of the apertures 400 in the forming structure 306 may be partially blocked by filaments of the scrim 302, some of the extended cells may be partially formed (and not actually be apertured) or have a different shape and/or size than the apertured extended cells that are formed without such obstructions, as described in further detail below.

The pulling of the polymer web 312 around the filaments 510 of the scrim 302 and towards the apertures 400 in the forming structure 306 also causes the polymer web 312 to attach to and encompass at least 50% of the circumferences of a portion of (i.e., some of) the plurality of filaments 510 of the scrim 302, which secures the scrim 302 to the polymer web 312, thereby resulting in the formed film. In the context of the present invention, "a portion of the plurality of filaments" is intended to refer to the manufactured condition where some of the filaments 510 of the scrim 302 are wrapped by the polymer web 312 so that at least 50% of the circumferences of those filaments 510 are encompassed by the polymer web 312. More specifically, the term "a portion of the plurality of filaments" is intended to mean that between 50% to 100% of the filaments 510 of the scrim 302 are coated by the polymer web 312 so that at least 50% of the circumferences of those filaments 510 are encompassed by the polymer web 312. As should be apparent, it is contemplated that some of the filaments 510 may not be encompassed by the polymer web 312 to a state where at least 50% of the circumferences of those filaments 510 are encompassed by the polymer web 312.

Separately, it is contemplated that, during manufacture, the polymer web 312 may attach to and encompass at least 50% of substantially all of (i.e., most or all of) the plurality of filaments 510 of the scrim 302. Here, "substantially all of the plurality of filaments" is intended to refer to the manufactured condition where most (or all) of the filaments 510 of the scrim 302 are wrapped by the polymer web 312 so that at least 50% of the circumferences of those filaments 510 are encompassed by the polymer web 312. More specifically, the term "substantially all of the plurality of filaments" is intended to mean that between 90% to 100% of the filaments 510 of the scrim 302 are coated by the polymer web 312 so that at least 50% of the circumferences of those filaments 510 are encompassed by the polymer web 312. Even here, it is contemplated that a few of the filaments 510 may not be encompassed by the polymer web 312 to a state where at least 50% of the circumferences of those filaments 510 are encompassed by the polymer web 312.

Returning to FIG. 3, the forming structure 306 also cools the polymer web 312 as it is transformed into a formed film so that the resulting scrubbing wipe 320, such as the scrubbing wipe described above and below, may be pulled off of the forming structure 306 by a roller 322, conveyed to a winder 324 via additional rollers 326, 328, and wound into a roll 330 by the winder 324. The illustrated embodiment is not intended to be limiting in any way. For example, in another embodiment, instead of extruding the polymer web 312 directly onto the scrim 302 and the forming structure 306, a polymer web that had been previously extruded onto a chilled roll and quenched into a solid polymer web may be reheated and conveyed to scrim 302 and the forming structure 306.

Figure 6B:
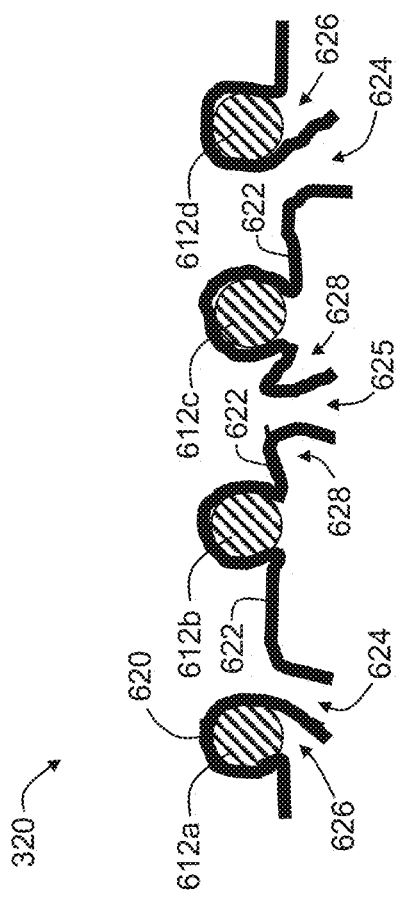
FIG. 6B is a picture of a magnified cross-section of a portion of the scrubbing wipe of FIG. 1B showing a filament of the scrim attached to a formed film.
Figure 6A:
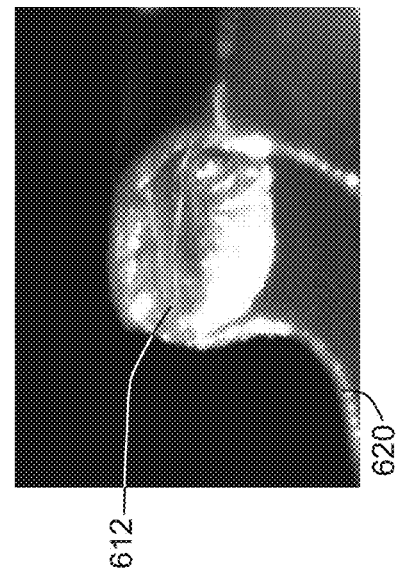
FIG. 6A schematically illustrates an enlarged view of a cross section of the scrubbing wipe of FIG. 1A.

FIG. 6A is a schematic cross-section of a portion of the scrubbing wipe 320 formed on the apparatus 300 of FIG. 3. As illustrated, the scrubbing wipe 320 includes a scrim that includes a plurality of filaments 612a, 612b, 612c, 612d, and a formed film 620. The filaments 612a, 612b, 612c, 612d are substantially parallel to and spaced from each other. The formed film 620 includes a land 622, and a plurality of apertured extended cells 624 extending from the land 622 and away from the filaments 612a, 612b, 612c, 612d of the scrim. FIG. 6B illustrates a single filament 612 with the formed film 620. As illustrated in FIGS. 6A and 6B, the formed film 620 is attached to the scrim and encompasses at least 50% of the circumferences of the illustrated filaments 612, 612a, 612b, 612c, 612d.

The location of the filaments 612 of the scrim relative to the apertures 400 of the forming structure 306 may influence the shape of each apertured extended cell 624. For example, if a filament 612 passes over an aperture 400 near an edge of the aperture 400 thereby partially blocking the aperture 400, the polymer web will coat the filament 612 and be pulled into the aperture 400, which will bend the polymer web around the filament 612 so that the extended cell 624 will have a sidewall that is angled relative to normal (i.e. perpendicular) to the scrim. This bending of the polymer will cause part of the sidewall to be located directly underneath the filament, as illustrated in FIG. 6A at the leftmost and rightmost filaments 612a and 612d. Such bending of the sidewall of the extended cell 624 creates an angled scrubbing pocket 626 between the sidewall of the extended cell 624 and the filament 612. For an aperture 400 in the forming structure 306 that is not blocked by one or more filaments, an apertured extended cell 625 will more fully form and extend substantially normal or perpendicular to the scrim, as illustrated in FIG. 6A in between filaments 612b and 612c, and create "neutral" (i.e. not angled) scrubbing pockets 628. The more fully formed apertured extended cells 625 will have larger apertures and longer sidewalls, as compared to the extended cells 624 that are at an angle relative to normal to the scrim. This random, but frequent, combination of "neutral" and angled scrubbing pockets oriented in different directions, as well as different lengths of the sidewalls of the extended cells, may provide the scrubbing wipe 320 with good scrubbing action regardless of the direction of motion of the scrubbing wipe in use. And, as discussed above, some of the extended cells may not be apertured.

EXAMPLE

The apparatus 300 illustrated in FIG. 3 was used to extrude a polymer web 312 comprising low density polyethylene, high density polyethylene, a surfactant, and a colorant onto the scrim 302 and forming structure 306 (illustrated in greater detail in FIG. 5) after the scrim 302 was unrolled from the scrim roll 304 and fed to the forming structure 306. The polymer web 312 had a basis weight of about 36 grams per square meter (gsm). The scrim 302 had a basis weight of about 63 grams per square meter (gsm), and the polypropylene filaments had an average diameter of about 20 mils (about 508 micrometers or microns). Adjacent filaments were spaced apart by about 120 mils (about 3 millimeters) in one bias direction and by about 115 mils (about 2.9 millimeters) in the other bias direction. The forming structure 306 had apertures 400 in the shape of an elongated hexagon with two opposing sides shorter than the remaining sides, as illustrated in FIG. 4. The apertures 400 were arranged in a 13 mesh pattern, i.e. 13 apertures per linear inch (about 5 apertures per linear centimeter).

A suitable vacuum was generated in the vacuum slot 308 to pull the polymer web 312 against the forming structure 306 with the scrim 302 positioned therebetween, as well as pull portions of the polymer web 312 into the apertures 400 of the forming structure 306. The polymer web 312 transformed into the formed film portion of the scrubbing wipe 320 (shown as the scrubbing wipe 100 in FIG. 1B) as the polymer web 312 cooled on the forming structure 306. The scrubbing wipe 320 was pulled off of the forming structure 306 with a roller 322 and wound into a roll 330.

Scrubbing wipes in accordance with embodiments of the invention each has a first side having a first texture substantially defined by the scrim coated by the formed film, and a second side having a second texture different from the first texture and substantially defined by the apertured extended cells of the formed film and scrubbing pockets created by the formed film and filaments of the scrim, as described above. The first texture may have a roughness that is greater than the roughness of the second texture, which may provide the scrubbing wipe with greater versatility than a scrubbing wipe with both sides having the same texture and roughness. In addition to the good scrubbing action provided by both sides of the scrubbing wipes, scrubbing wipes according to embodiments of the invention allow fluids, such as water and/or soaps and other cleaners, to flow through the scrubbing wipes, which may enhance the scrubbing action even further. In an embodiment, the scrubbing wipe may be used in conjunction with an absorbent material configured to deliver fluids to the scrubbing wipe and/or absorb excess fluids. Scrubbing wipes in accordance with embodiments of the invention are compression resistant and provide a void volume when used with other substrates and materials.

Although embodiments of the invention described above are directed to scrubbing wipes, it is contemplated that the same or similar structures may be used in other applications. For example, embodiments of the invention may be used for ground covering, breathable wrap, or any other application in which rigidity and fluid transport through the material are desired.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A scrubbing wipe, comprising:
   a scrim comprising a first plurality of filaments and a second plurality of filaments, wherein the first plurality of filaments are substantially parallel and spaced apart from each other, wherein the second plurality of filaments are substantially parallel and spaced apart from each other, wherein the second plurality of filaments are angled with respect to the first plurality of filaments substantially orthogonally to each other ±150 to form a net-like pattern defining a plurality of openings therethrough, and wherein the scrim has a basis weight in a range of 40-100 grams per square meter; and
   a formed film attached to the scrim,
   wherein the formed film passes through at least a portion of the plurality of openings and encompasses at least 50% of the circumferences of at least a portion of the plurality of filaments such that the formed film forms a plurality of apertured extended cells extending away from the scrim and a plurality of extended cells without apertures, wherein a ratio of a number of the plurality of apertured extended cells to a number of the plurality of extended cells without apertures is ≥50%.

2. The scrubbing wipe according to claim 1, wherein the formed film encompasses at least 50% of the circumferences of substantially all of the plurality of filaments.

3. The scrubbing wipe according to claim 1, wherein sidewalls of the apertured extended cells form scrubbing pockets with the filaments of the scrim.

4. The scrubbing wipe according to claim 3, wherein at least some of the sidewalls of the apertured extended cells extend in a direction normal to a plane containing the scrim, and wherein at least some of the sidewalls of the apertured extended cells extend in a direction angled relative to normal to the plane containing the scrim.

5. The scrubbing wipe according to claim 1, wherein the basis weight of the scrim is in the range of 60-65 grams per square meter.

6. The scrubbing wipe according to claim 1, wherein the plurality of filaments of the scrim comprise polypropylene.

7. The scrubbing wipe according to claim 1, wherein each of the plurality of filaments has a diameter in the range of 430-560 micrometers.

8. The scrubbing wipe according to claim 1, wherein adjacent filaments are substantially parallel to each other and spaced apart by a distance in the range of 2.8-3.3 millimeters.

9. The scrubbing wipe according to claim 1, wherein the formed film has a basis weight in the range of 35-40 grams per square meter.

10. The scrubbing wipe according to claim 1, wherein the formed film comprises polyethylene.

11. The scrubbing wipe according to claim 10, wherein the formed film comprises a blend of low density polyethylene and high density polyethylene.

12. The scrubbing wipe according to claim 10, wherein the formed film further comprises a surfactant.

13. The scrubbing wipe according to claim 1, wherein the plurality of apertured extended cells are arranged in a pattern of 4-6 apertured extended cells per linear centimeter.

14. The scrubbing wipe according to claim 1, wherein the ratio is ≥60%.

15. The scrubbing wipe according to claim 1, wherein the ratio is ≥70%.

16. The scrubbing wipe according to claim 1, wherein the ratio is ≥80%.

17. The scrubbing wipe according to claim 1, wherein the ratio is ≥90%.

18. The scrubbing wipe according to claim 1, wherein the ratio is ≥95%.

19. The scrubbing wipe according to claim 1, wherein the ratio is 100%.

20. A scrubbing wipe, comprising:
    a scrim comprising a first plurality of filaments and a second plurality of filaments, wherein the first plurality of filaments are substantially parallel and spaced apart from each other by a first spacing, wherein the second plurality of filaments are substantially parallel and spaced apart from each other by a second spacing, wherein the first spacing differs from the second spacing, wherein the second plurality of filaments are angled with respect to the first plurality of filaments substantially orthogonally to each other ±15° to form a net-like pattern defining a plurality of openings therethrough, wherein the scrim comprises a first surface and a second surface, and wherein the scrim has a basis weight in a range of 40-100 grams per square meter; and
    a formed film attached to the first surface of the scrim, wherein the formed film passes through at least a portion of the plurality of openings such that the formed film forms a plurality of apertured extended cells extending away from the second surface of the scrim.

21. The scrubbing wipe according to claim 20, wherein the plurality of filaments of the scrim comprise polypropylene.

22. The scrubbing wipe according to claim 20, wherein the formed film encompasses at least 50% of the circumferences of at least a portion of the plurality of filaments.

23. The scrubbing wipe according to claim 20, wherein the formed film encompasses at least 50% of the circumferences of substantially all of the plurality of filaments.

24. The scrubbing wipe according to claim 20, wherein sidewalls of the apertured extended cells form scrubbing pockets with the filaments of the scrim at the second surface.

25. The scrubbing wipe according to claim 24, wherein at least some of the sidewalls of the apertured extended cells extend in a direction normal to the second surface of the scrim, and wherein at least some of the sidewalls of the apertured extended cells extend in a direction angled relative to normal to the second surface of the scrim.

26. The scrubbing wipe according to claim 20, wherein the basis weight of the scrim is in the range of 60-65 grams per square meter.

27. The scrubbing wipe according to claim 20, wherein each of the plurality of filaments has a diameter in the range of 430-560 micrometers.

28. The scrubbing wipe according to claim 20, wherein the formed film has a basis weight in the range of 35-40 grams per square meter.

29. The scrubbing wipe according to claim 20, wherein the formed film comprises polyethylene.

30. The scrubbing wipe according to claim 29, wherein the formed film comprises a blend of low density polyethylene and high density polyethylene.

31. The scrubbing wipe according to claim 29, wherein the formed film further comprises a surfactant.

32. The scrubbing wipe according to claim 20, wherein the plurality of apertured extended cells are arranged in a pattern of 4-6 apertured extended cells per linear centimeter.

33. The scrubbing wipe according to claim 20, wherein the first spacing and the second spacing are in a range of 2.0-4.0 millimeters.

34. The scrubbing wipe according to claim 20, wherein the first spacing and the second spacing are in a range of 2.5-3.5 millimeters.

35. The scrubbing wipe according to claim 20, wherein the first spacing and the second spacing are in a range of 2.8-3.3 millimeters.

* * * * *